US011072102B2

(12) United States Patent
Unkovic et al.

(10) Patent No.: US 11,072,102 B2
(45) Date of Patent: Jul. 27, 2021

(54) IN-MOLD NON-TIME DEPENDENT DETERMINATION OF INJECTION MOLDED PART EJECTION READINESS

(71) Applicant: IMFLUX, INC., Hamilton, OH (US)

(72) Inventors: Nicholas Mulkern Unkovic, Mason, OH (US); Gene Michael Altonen, West Chester, OH (US); Daniel Lumpkin, Cincinnati, OH (US); William Francis Lawless, III, Medford, MA (US); H. Kenneth Hanson, III, Cincinnati, OH (US); Chow-Chi Huang, West Chester, OH (US)

(73) Assignee: IMFLUX, INC., Hamilton, OH (US)

( * ) Notice: Subject to any disclaimer, the term of this patent is extended or adjusted under 35 U.S.C. 154(b) by 244 days.

(21) Appl. No.: 15/943,786

(22) Filed: Apr. 3, 2018

(65) Prior Publication Data
US 2018/0281257 A1     Oct. 4, 2018

Related U.S. Application Data

(60) Provisional application No. 62/481,291, filed on Apr. 4, 2017.

(51) Int. Cl.
*B29C 45/76* (2006.01)
*B29C 45/40* (2006.01)
*B29C 45/78* (2006.01)

(52) U.S. Cl.
CPC ...... *B29C 45/7626* (2013.01); *B29C 45/4005* (2013.01); *B29C 45/76* (2013.01);
(Continued)

(58) Field of Classification Search
None
See application file for complete search history.

(56) References Cited

U.S. PATENT DOCUMENTS

| | | | | | |
|---|---|---|---|---|---|
| 4,208,176 A | * | 6/1980 | Salerno | ............ | B29C 45/76 425/139 |
| 4,236,181 A | * | 11/1980 | Shibata | ............ | B29C 45/7626 250/559.39 |

(Continued)

FOREIGN PATENT DOCUMENTS

| | | |
|---|---|---|
| CN | 101181818 A | 5/2008 |
| TW | 200504345 A | 2/2005 |

(Continued)

OTHER PUBLICATIONS

Charles L. Thomas et al., "Solidification Sensing for Closed Loop Control of Injection Molding Time," Advances in Polymer Technology, vol. 15, No. 2,151-163 (1996) (Year: 1996).*

(Continued)

*Primary Examiner* — Matthew J Daniels
*Assistant Examiner* — Paul Spiel
(74) *Attorney, Agent, or Firm* — Marshall, Gerstein & Borun LLP

(57) ABSTRACT

Non-time dependent measured variables are used to effectively determine an optimal ejection time of a part from a mold cavity. A system and/or approach may first measure at least one non-time dependent variable during an injection molding cycle. The part is ready to be ejected from the mold upon the measured variable reaching a threshold value indicative of, for example, a part temperature dropping below an activation temperature.

9 Claims, 8 Drawing Sheets

(52) U.S. Cl.
CPC ............ *B29C 45/78* (2013.01); *B29C 45/762* (2013.01); *B29C 2945/761* (2013.01); *B29C 2945/7604* (2013.01); *B29C 2945/76006* (2013.01); *B29C 2945/7616* (2013.01); *B29C 2945/7629* (2013.01); *B29C 2945/76127* (2013.01); *B29C 2945/76153* (2013.01); *B29C 2945/76257* (2013.01); *B29C 2945/76414* (2013.01); *B29C 2945/76418* (2013.01); *B29C 2945/76474* (2013.01); *B29C 2945/76943* (2013.01)

(56) References Cited

U.S. PATENT DOCUMENTS

| | | | |
|---|---|---|---|
| 5,384,079 A | | 1/1995 | Bur et al. |
| 5,519,211 A | | 5/1996 | Bur et al. |
| 5,566,743 A | * | 10/1996 | Guergov ............... B22D 17/10 164/113 |
| 2004/0230411 A1 | | 11/2004 | Zheng et al. |
| 2005/0240303 A1 | | 10/2005 | Smith |
| 2011/0101555 A1 | * | 5/2011 | Kazmer ................. B29C 45/76 264/40.6 |
| 2015/0028507 A1 | * | 1/2015 | Kukla .................... G01N 29/14 264/40.1 |
| 2015/0035189 A1 | | 2/2015 | Altonen et al. |
| 2018/0079127 A1 | * | 3/2018 | Aoki ....................... B29C 45/78 |

FOREIGN PATENT DOCUMENTS

| | | |
|---|---|---|
| WO | WO-2005/052525 A2 | 6/2005 |
| WO | WO-2006/007749 A1 | 1/2006 |
| WO | WO-2009/129230 A2 | 10/2009 |
| WO | WO-2017/015573 A1 | 1/2017 |

OTHER PUBLICATIONS

Anthony J. Bur et al., "In-Line Optical Monitoring of Polymer Injection Molding," Polymer Engineering and Science, Apr. 1994, vol. 34, No. 8 (Year: 1994).*

Wang et al., "On-Line Ultrasonic Monitoring of the Injection Molding Process," Polymer Engineering and Science, Feb. 1997, vol. 37, No. 2 (Year: 1997).*

Sors, "Optimum Temperature for Removal of Injection Mouldings", International Polymer Science and Technology, 22(1):T/78-T/81 (1995).

Straet T et al., "Ultraschallmessungen an Duroplastischen Formmassen // Ultrasonic Measurements on Thermoset Moulding Compounds", Kunstsoffe Internati, 95(7):73-77 (2005).

International Search Report and Written Opinion, corresponding International Application No. PCT/US2018/025783, dated Jul. 2, 2018.

European Patent Application No. 18719026.9, Communication Pursuant to Article 94(3) EPC, dated Oct. 20, 2020.

Chinese Patent Application No. 201880021042.X, Notice on the First Office Action, dated Apr. 2, 2021.

Taiwan Patent Application No. 107111873, Office Action and Search Report, dated May 7, 2021.

Chinese Patent Application No. 201880021042.X, First Office Action, dated Apr. 2, 2021.

\* cited by examiner

IN-MOLD NON-TIME DEPENDENT DETERMINATION OF INJECTION MOLDED PART EJECTION READINESS

CROSS-REFERENCE TO RELATED APPLICATION

This application claims priority to U.S. Provisional Application No. 62/481,291, entitled "In-Mold Non-Time Dependent Determination of Injection Molded Part Ejection Readiness", and filed Apr. 4, 2017, the entirety of which is incorporated by reference herein.

FIELD OF THE DISCLOSURE

The present disclosure relates generally to injection molding and, more particularly, to approaches for making determinations of part readiness while the part is still within the mold cavity using non-time dependent parameters and/or variables to open the injection mold and eject the molded part.

BACKGROUND

Injection molding is a technology commonly used for high-volume manufacturing of parts constructed of thermoplastic materials. During repetitive injection molding processes, a thermoplastic resin, typically in the form of small pellets or beads, is introduced into an injection molding machine which melts the pellets under heat and pressure. The molten material is then forcefully injected into a mold cavity having a particular desired cavity shape. The injected plastic is held under pressure in the mold cavity and subsequently is cooled and removed as a solidified part having a shape closely resembling the cavity shape of the mold. A single mold may have any number of individual cavities which can be connected to a flow channel by a gate that directs the flow of the molten resin into the cavity. A typical injection molding procedure generally includes four basic operations: (1) heating the plastic in the injection molding machine to allow the plastic to flow under pressure; (2) injecting the melted plastic into a mold cavity or cavities defined between two mold halves that have been closed; (3) allowing the plastic to cool and harden in the cavity or cavities while under pressure; and (4) opening the mold halves and ejecting the part from the mold.

In these systems, the injected plastic is ejected from the mold at a predetermined time. This ejection time is determined or calculated to provide the injected plastic sufficient time to cool and harden to the desired final shape, also described as solidification, so the plastic does not deform or become otherwise damaged upon or after being ejected. However, due to material and machine variances, using time as the determining variable can still result in either pre-or-post mature ejection which in turn may result in a faulty molded part. For example, a melted plastic may have slightly different material characteristics in subsequent injection cycles, thus if subsequent injection cycles were to depend on prior ejection times, the occurrence of part imperfections, faults, and other irregularities may arise. If a part is held in the cavity longer than needed, the overall injection molding cycle is unnecessarily long, thus the injection molding machine consumes excess energy which in turn increases operating costs and adversely impacting production capacity. Other disadvantages resulting from overly long cycles include material stiffening and increased part shrinkage into the core, either of which may also increase the force required to eject the part, which can result in pin-push or part hang-ups. Additionally, prematurely ejected parts may exhibit dimensions that are out of specification as well as warpage. An excessive cooling time may also result in cycling problems due to material degradation within the molding machine, part sticking, or dimensions being out of specification.

SUMMARY

Embodiments within the scope of the present invention are directed to the use of non-time dependent measured variables to effectively determine an optimal ejection time of one or more parts from a mold cavity. A system and/or approach may first measure at least one non-time dependent variable during an injection molding cycle. The part is ready to be ejected from the mold upon the measured variable reaching a threshold value indicative of a part temperature dropping below an activation temperature.

In these examples, a suitable part hardening point is determined by measuring and/or observing mold behavior to discern any of a number of changes in in-mold characteristics. Sensing devices can be used to measure the mold behavior that may be indicative of a phase change in the plastic material in the mold, which in turn may be interpreted as the part being ready, or nearly ready, for ejection. By optimizing the ejection time, the recovery time of the machine may be reduced. Measurements obtained from the non-time dependent variable or variables can be used as a highly accurate measure of when to make process parameter decisions. Because injection molding machines heat up over a period of time, the time required to reach the suitable hardening point may vary over this time period, thus by relying on a non-time dependent variable or parameter, accurate and optimal mold ejection determinations can be made over extended machine operating periods.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION

Figure 1:
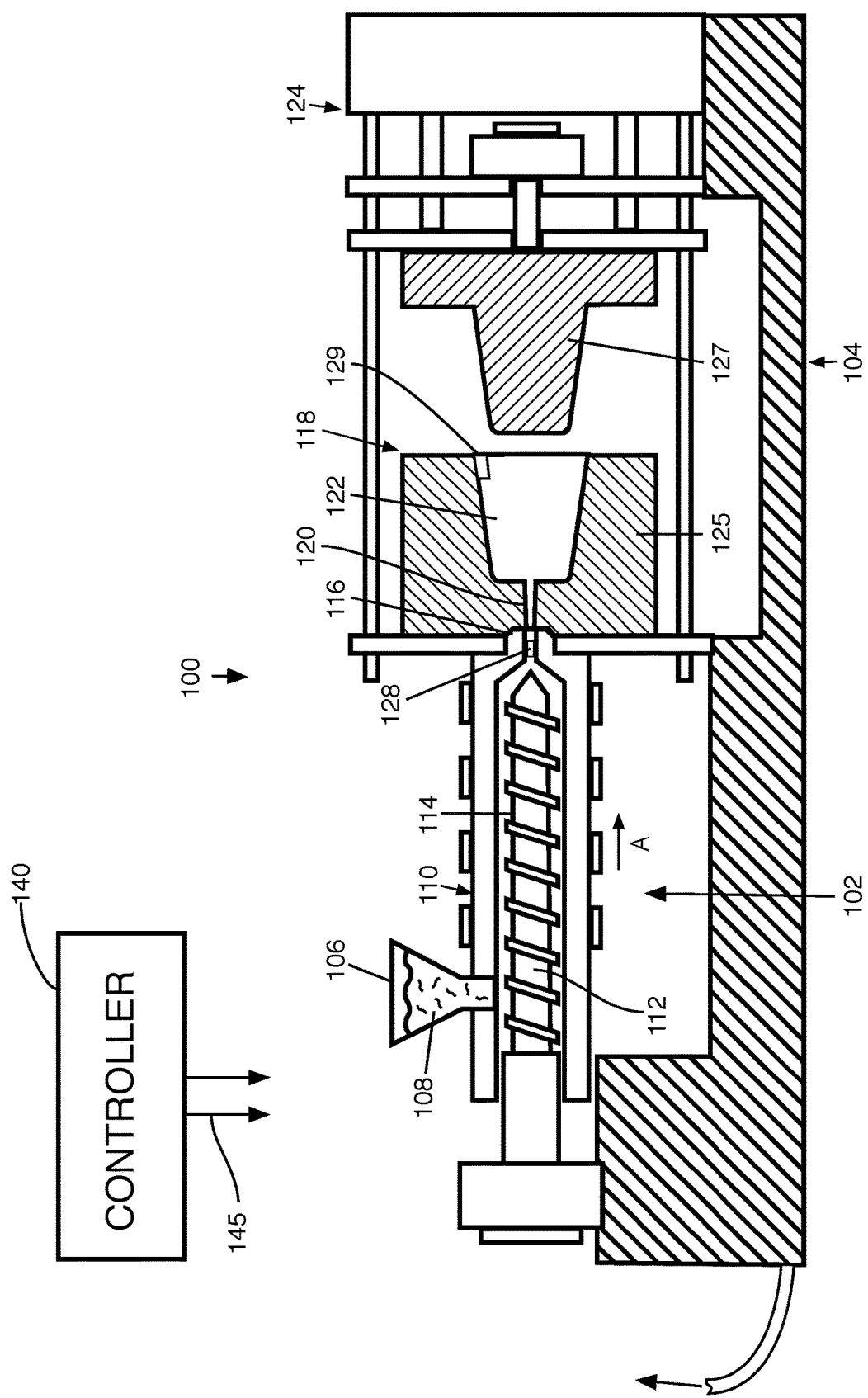
FIG. 1 illustrates a schematic view of an example injection molding machine having a controller coupled thereto in accordance with various embodiments of the present disclosure.

Turning to the drawings, an injection molding process is herein described. The approaches described herein may be suitable for electric presses, servo-hydraulic presses, and other known machines. As illustrated in FIG. 1, the injection molding machine 100 includes an injection unit 102 and a clamping system 104. The injection unit 102 includes a hopper 106 adapted to accept material in the form of pellets 108 or any other suitable form. In many of these examples, the pellets 108 may be a polymer or polymer-based material. Other examples are possible.

The hopper 106 feeds the pellets 108 into a heated barrel 110 of the injection unit 102. Upon being fed into the heated barrel 110, the pellets 108 may be driven to the end of the heated barrel 110 by a reciprocating screw 112. The heating of the heated barrel 110 and the compression of the pellets 108 by the reciprocating screw 112 causes the pellets 108 to melt, thereby forming a molten plastic material 114. The molten plastic material 114 is typically processed at a temperature selected within a range of about 130° C. to about 410° C.

The reciprocating screw 112 advances forward and forces the molten plastic material 114 toward a nozzle 116 to form a shot of plastic material which will ultimately be injected into a mold cavity 122 of a mold 118 via one or more gates 120 which direct the flow of the molten plastic material 114 to the mold cavity 122. In other embodiments, the nozzle 116 may be separated from one or more gates 120 by a feed system (not illustrated). The mold cavity 122 is formed between the first and second mold sides 125, 127 of the mold 118 and the first and second mold sides 125, 127 are held together under pressure via a press or clamping unit 124.

The press or clamping unit 124 applies a predetermined clamping force during the molding process which is greater than the force exerted by the injection pressure acting to separate the two mold halves 125, 127, thereby holding together the first and second mold sides 125, 127 while the molten plastic material 114 is injected into the mold cavity 122. To support these clamping forces, the clamping system 104 may include a mold frame and a mold base, in addition to any other number of components.

Once the shot of molten plastic material 114 is injected into the mold cavity 122, the reciprocating screw 112 halts forward movement. The molten plastic material 114 takes the form of the mold cavity 122 and cools inside the mold 118 until the plastic material 114 solidifies. Upon solidifying, the press 124 releases the first and second mold sides 115, 117, which are then separated from one another. The finished part may then be ejected from the mold 118. The mold 118 may include any number of mold cavities 122 to increase overall production rates. The shapes and/or designs of the cavities may be identical, similar, and/or different from each other.

The injection molding machine 100 also includes a controller 140 which is communicatively coupled with the machine 100 via connection 145. The connection 145 may be any type of wired and/or wireless communications protocol adapted to transmit and/or receive electronic signals. In these examples, the controller 140 is in signal communication with at least one sensor, such as, for example, sensor 128 located in the nozzle 116 and/or a sensor 129 located proximate an end of the mold cavity 122. It is understood that any number of additional sensors capable of sensing any number of characteristics of the mold 118 and/or the machine 100 may be placed at desired locations of the machine 100.

The controller 140 can be disposed in a number of positions with respect to the injection molding machine 100. As examples, the controller 140 can be integral with the machine 100, contained in an enclosure that is mounted on the machine, contained in a separate enclosure that is positioned adjacent or proximate to the machine, or can be positioned remote from the machine. In some embodiments, the controller 140 can partially or fully control functions of the machine via wired and/or wired signal communications as known and/or commonly used in the art.

The sensor 128 may be any type of sensor adapted to measure (either directly or indirectly) one or more characteristics of the molten plastic material 114. The sensor 128 may measure any characteristics of the molten plastic material 114 that are known and used in the art, such as, for example, pressure, temperature, viscosity, flow rate, hardness, strain, optical characteristics such as translucency, color, light refraction, and/or light reflection, and the like, or any one or more of any number of additional characteristics which are indicative of these. The sensor 128 may or may not be in direct contact with the molten plastic material 114. In some examples, the sensor 128 may be adapted to measure any number of characteristics of the injection molding machine 100 and not just those characteristics pertaining to the molten plastic material 114.

The sensor 128 generates a signal which is transmitted to an input of the controller 140. If the sensor 128 is not located within the nozzle 116, the controller 140 can be set, configured, and/or programmed with logic, commands, and/or executable program instructions to provide appropriate correction factors to estimate or calculate values for the measured characteristic in the nozzle 116.

Similarly, the sensor 129 may be any type of sensor adapted to measure (either directly or indirectly) one or more characteristics of the molten plastic material 114 to detect its presence and/or condition in the mold cavity 122. In various embodiments, the sensor 129 may be located at or near an end-of-fill position in the mold cavity 122. The sensor 129 may measure any number of characteristics of the molten plastic material 114 and/or the mold cavity 122 that are known in the art, such as, for example, pressure, temperature, viscosity, flow rate, hardness, strain, optical characteristics such as translucency, color, light refraction, and/or light reflection, and the like, or any one or more of any number of additional characteristics which are indicative of these. The sensor 129 may or may not be in direct contact with the molten plastic material 114.

The sensor 129 generates a signal which is transmitted to an input of the controller 140. If the sensor 129 is not located at the end-of fill position in the mold cavity 122, the controller 140 can be set, configured, and/or programmed with logic, commands, and/or executable program instructions to provide appropriate correction factors to estimate or calculate values for the measured characteristic at the endof-fill position. It is understood that any number of additional sensors may be used to sense and/or measure operating parameters.

The controller 140 is also in signal communication with a screw control 126. In some embodiments, the controller 140 generates a signal which is transmitted from an output of the controller 140 to the screw control 126. The controller 140 can control any number of characteristics of the machine, such as, for example, injection pressures (by controlling the screw control 126 to advance the screw 112 at a rate which maintains a desired melt pressure of the molten plastic material 114 in the nozzle 116), barrel temperatures, clamp closing and/or opening speeds, cooling time, inject forward time, overall cycle time, pressure set points, ejection time, screw recovery speed, and screw velocity. Other examples are possible.

The signal or signals from the controller 140 may generally be used to control operation of the molding process such that variations in material viscosity, mold temperatures, melt temperatures, and other variations influencing filling rate are taken into account by the controller 140. Adjustments may be made by the controller 140 in real time or in near-real time (that is, with a minimal delay between sensors 128, 129 sensing values and changes being made to the process), or corrections can be made in subsequent cycles. Furthermore, several signals derived from any number of individual cycles may be used as a basis for making adjustments to the molding process. The controller 140 may be connected to the sensors 128, 129, the screw control 126, and or any other components in the machine 100 via any type of signal communication approach known in the art.

The controller 140 includes software 141 adapted to control its operation, any number of hardware elements 142 (such as, for example, a memory module and/or processors), any number of inputs 143, any number of outputs 144, and any number of connections 145. The software 141 may be loaded directly onto a memory module of the controller 140 in the form of a non-transitory computer readable medium, or may alternatively be located remotely from the controller 140 and be in communication with the controller 140 via any number of controlling approaches. The software 141 includes logic, commands, and/or executable program instructions which may contain logic and/or commands for controlling the injection molding machine 100 according to a mold cycle. The software 141 may or may not include an operating system, an operating environment, an application environment, and/or a user interface.

The hardware 142 uses the inputs 143 to receive signals, data, and information from the injection molding machine being controlled by the controller 140. The hardware 142 uses the outputs 144 to send signals, data, and/or other information to the injection molding machine. The connection 145 represents a pathway through which signals, data, and information can be transmitted between the controller 140 and its injection molding machine 100. In various embodiments this pathway may be a physical connection or a non-physical communication link that works analogous to a physical connection, direct or indirect, configured in any way described herein or known in the art. In various embodiments, the controller 140 can be configured in any additional or alternate way known in the art.

The connection 145 represents a pathway through which signals, data, and information can be transmitted between the controller 140 and the injection molding machine 100. In various embodiments, these pathways may be physical connections or non-physical communication links that work analogously to either direct or indirect physical connections configured in any way described herein or known in the art. In various embodiments, the controller 140 can be configured in any additional or alternate way known in the art.

As previously stated, during an injection molding cycle, the sensors 128, 129 are adapted to measure at least one variable related to operation of the machine 100. Upon the measured variable reaching a threshold value indicative of the part being structurally sound, that is, meeting visual, dimensional, and structural requirements, the controller 140 will send a signal to the machine that causes the mold cavity 122 to open and to eject the part from the mold 118. In these examples, the variable or characteristic may be one other than time (e.g., a cycle, step, or any other time), thus time is not directly measured and used to determine when to eject the part. Rather, the variable or characteristic relies on another value or indicator as a determining factor for part readiness.

Figure 2:
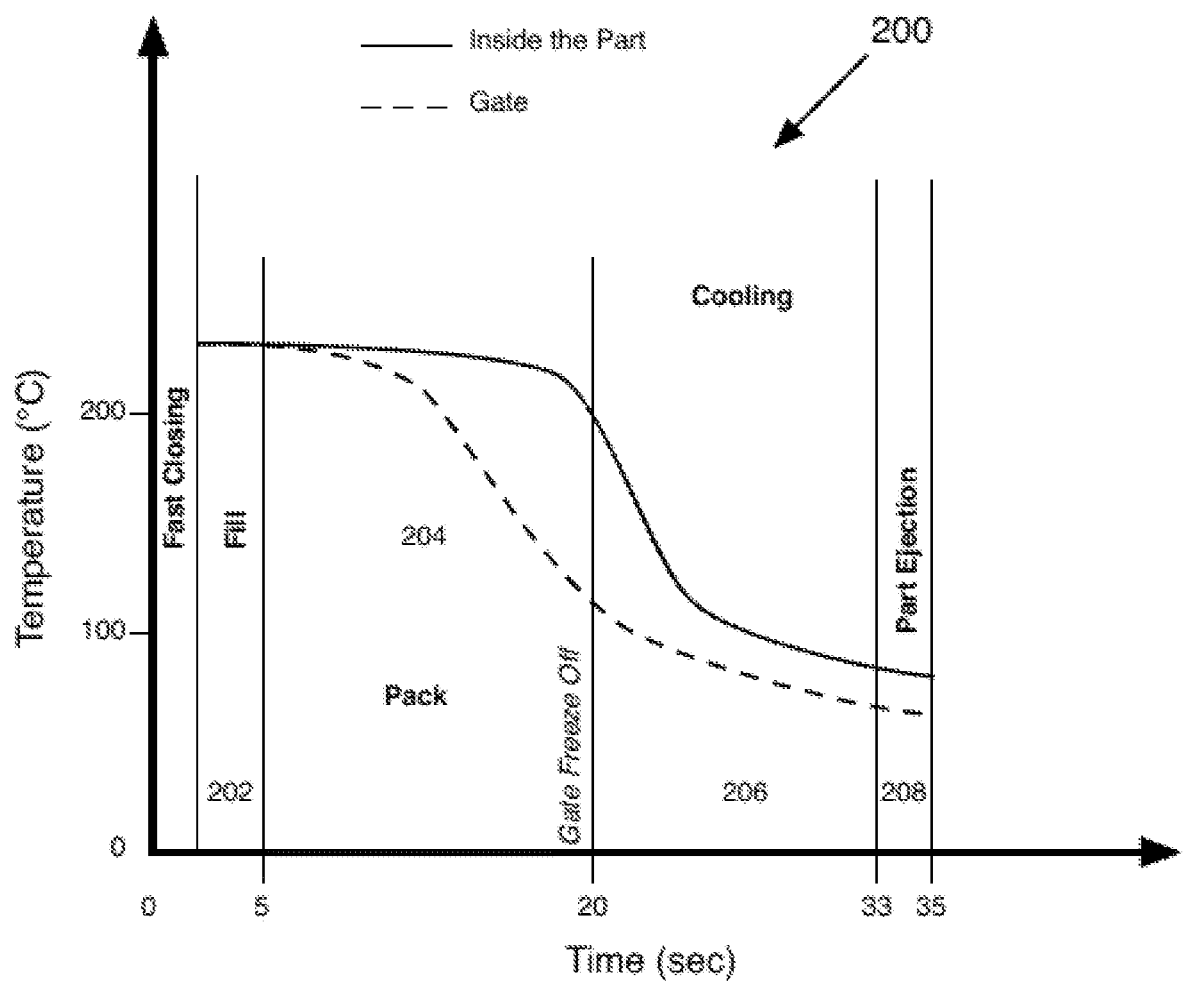
FIG. 2 illustrates an example temperature profile for an injection molding cycle in accordance with various embodiments of the present disclosure.

As illustrated in FIG. 2, an example temperature profile 200 of an injection molding cycle includes a number of distinct stages. In this example, the sensors 128, 129 are any type of temperature sensors (e.g., infrared sensors, thermocouples, negative temperature coefficient thermistors, and/or resistance temperature detectors) and are disposed at the gate 120 and at a location inside or near the inside of the mold 118. During a first stage 202, the molten plastic material 114 fills the mold cavity 122. In this stage 202, both the gate and mold temperatures are relatively constant. During stage 204, after the mold cavity 122 is filled, the molten plastic material 114 begins to pack into the mold cavity 122. Here, the gate temperature experiences a dramatic drop and the part temperature gradually declines. During the cooling stage 206, gate 120 freeze off occurs, and the mold begins the cooling phase. The cavity 122 temperature rapidly decreases, while the gate temperature begins to plateau. In the cooling stage 206, the part becomes hardened and solidified as sufficient heat is removed, thus, as the temperature values continue to approach the plateau, the part continues to solidify. At the fourth stage 208, the part is sufficiently structurally sound to be ejected from the cavity 122.

In these examples, the defining threshold value can be a gate freeze off temperature value. Accordingly, upon the sensor 128 measuring a temperature value below a specified gate freeze off value, the controller 140 may transmit a signal to cause the part to be ejected. In some examples, a bulk average temperature value and/or a limiting wall temperature value may be used as the defining threshold value.

In some examples, temperature values slightly above or below the actual gate freeze off temperature of the polymer may be used as the threshold value. For example, if the polymer is Polymethyl methacrylate (PMMA), a suitable threshold value may be approximately 20° C. above or below the actual gate freeze off temperature. In addition to gate freeze off temperature, known properties for particular plastic materials such as Deflection Temperature Under Load (DTUL) or Heat Deflection/Distortion Temperature (HDT) may be used. In the case of PMMA, this temperature would range between approximately 85° C. and 95° C. Other examples are possible.

In some examples, the defining threshold value can be a rate of change or decay in the gate 120 or the cavity 122 temperature. The controller 140 may calculate the rate of change by any number of approaches, such as, for example, by comparing temperature values over a given interval. As a non-limiting example, the heat flow change that occurs at the crystallization temperature of semi-crystalline polymers may be indicative of the molded part being sufficiently solidified to be ejected from the mold 118 or a reference point to calculate the appropriate ejection time. In some of these examples, a variable such as a change in the rate of change or an area under the temperature curve may be used to determine whether the part is sufficiently solidified to a point where the part will not deform or be damaged upon ejection from the cavity 120.

Figure 3:
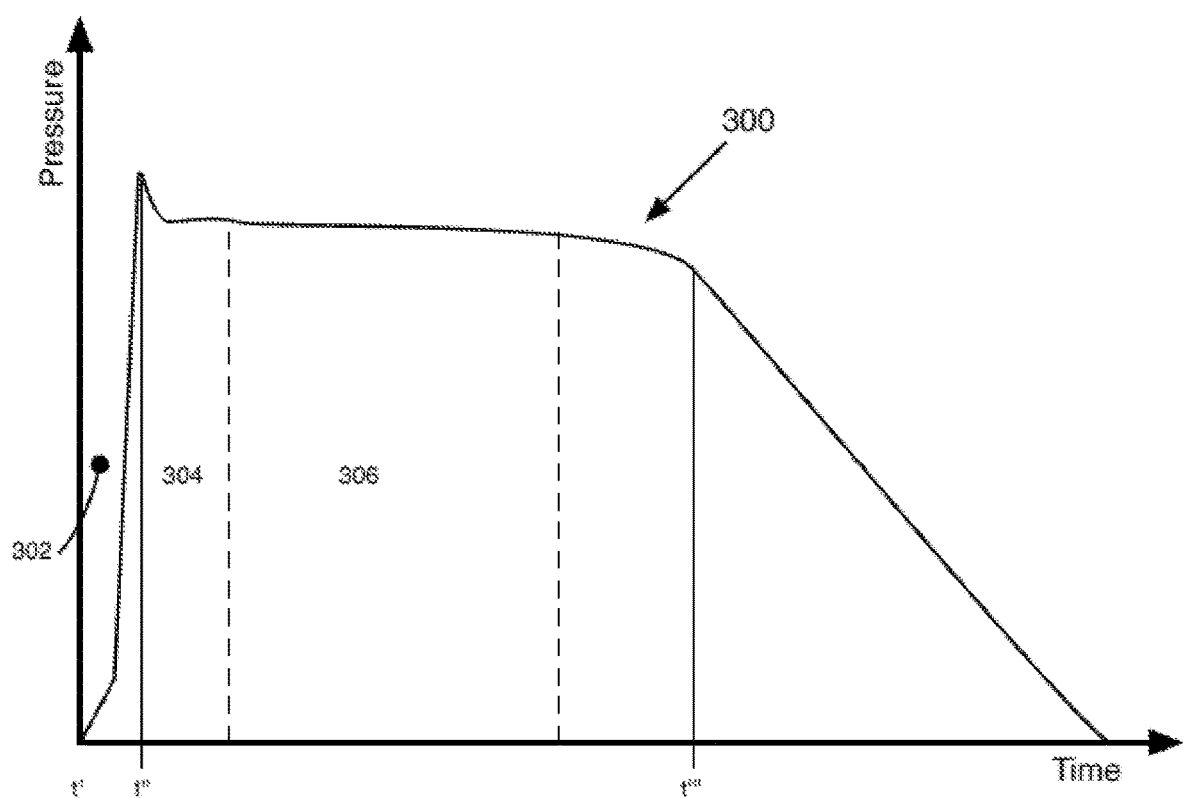
FIG. 3 illustrates an example pressure profile for an injection molding cycle in accordance with various embodiments of the present disclosure.

Turning to FIG. 3, a typical pressure profile for a conventional (e.g., a high pressure) injection molding process 300 is illustrated. It will be appreciated that other pressure profiles (e.g., a substantially constant pressure profile) may be used in conjunction with the non-time dependent variables described herein. In the illustrated example, the sensors 128, 129 are any type of pressure sensors (e.g., gauge pressure sensors, differential pressure sensors, force collector type sensors such as piezo resistive strain gauges, capacitive sensors, resonant sensors, thermal sensors, and/or electromagnetic sensors) and can be disposed at the gate 120 and/or at a location inside or near the inside of the mold 118. In this process 300, melt pressure is rapidly increased to a peak pressure (e.g., over 15,000 psi) and then held at a pressure at or close to that peak during a first period of time or stage 302. The next stage 304 represents the fill time in which the molten plastic material 114 flows into the mold cavity 122. Next, the melt pressure is decreased and held at a lower pressure for a subsequent period of time or stage 306. The third stage 306 is a packing stage in which the melt pressure is maintained to ensure that all gaps in the mold cavity 122 are back filled. In these systems, the mold cavity 122 is filled from the end of the flow channel back towards the gate 120. As a result, molten plastic material 114 in various stages of solidification is packed upon itself.

In these examples, the defining threshold value can be a gate 120 or cavity 122 pressure value. Accordingly, upon the sensor 128 measuring a pressure value below a specified pressure value that is indicative of the part being structurally sound such that it will not deform or be damaged upon ejection from the cavity 120, the controller 140 may transmit a signal to cause the part to be ejected. As an example, the mold may be opened, or a next step in the process can begin, based on an absolute drop in cavity pressure that is indicative of the polymeric material at the gate 120 freezing. The optimal cavity pressure to eject a part will differ depending on the shrinkage rate of each particular polymer, part application, and part specifications. For any given polymer, an optimal cavity pressure to eject the part can be determined based on part geometry, material, and application. Other examples are possible.

In some examples, the defining threshold value can be a rate of change or decay in the gate 120 or the cavity 122 pressure. The controller 140 may calculate the rate of change by any number of approaches, such as by comparing pressure values over a given interval. The rate of change of cavity pressure will differ depending on polymer shrinkage rates. For a given polymer, an optimal cavity pressure to eject the part from the mold 118 can be determined. This value will differ depending on the part geometry, material, and application. In some of these examples, a variable such as a change in the rate of change or an area under the pressure curve may be used to determine whether the part is sufficiently solidified to a point where the part will not deform or be damaged upon ejection from the cavity 120.

In some examples, a pressure transducer may be used to sense the mold filling. As the transducer senses the change in pressure, it may send an electrical charge that is converted to a calibrated voltage signal that the controller 140 interprets to identify a specified level of mold fill. In some examples, the pressure transducer may act as a trigger upon sensing the polymer reaching an end-of-fill position, and may send a signal to the controller 140 to cause an additional sensor or sensors to detect a non-time dependent characteristic. For example, the controller 140 may activate a hardness detector to determine when the part hardness reaches a threshold value. In other examples, the pressure transducer may be used in a "semi" time-dependent approach whereby after sensing the mold fill reaching a certain point (e.g., an end of fill point), a timer may then be activated to eject the part at a desired time. So configured, if a particular non-time dependent sensor is costly or difficult to run on a constant basis, sensing end-of-fill by the pressure transducer can reduce a burden or load on the other sensor or sensors. Other examples of uses for the pressure transducer are possible.

In some examples, a freeze detection sensor may be used and may be positioned inside or outside of the mold cavity 122. For example, the sensor or sensors 128, 129 may be an indirect sensor, a submarined sensor (e.g., a thin wall of a cavity insert is disposed between the cavity surface and the sensor), and/or a strain gauge disposed on the cavity or core insert, a cavity or core frame plate, or a parting line sensor. In the case of a cold runner system or a mold with a material delivery system that connects to the mold cavity, analysis of the runner system solidification and thermal properties can be performed in order to avoid contact with the molded part.

In some examples, the sensor or sensors 128, 129 may be adapted to measure an amount of crystallinity in the part being formed. For example, for polymeric material whose discernible crystallinity is indicative of parts molded of that material being ready for ejection from a mold cavity, the sensor or sensors 128, 129 may be an X-Ray diffraction sensor capable of measuring the nature of the polymer and the extent of crystallinity in the polymer. The sensed value may be sent to the controller 140 which can compare the value to a threshold value indicative of crystallinity of a structurally sound molded part made of that material.

Figure 4:
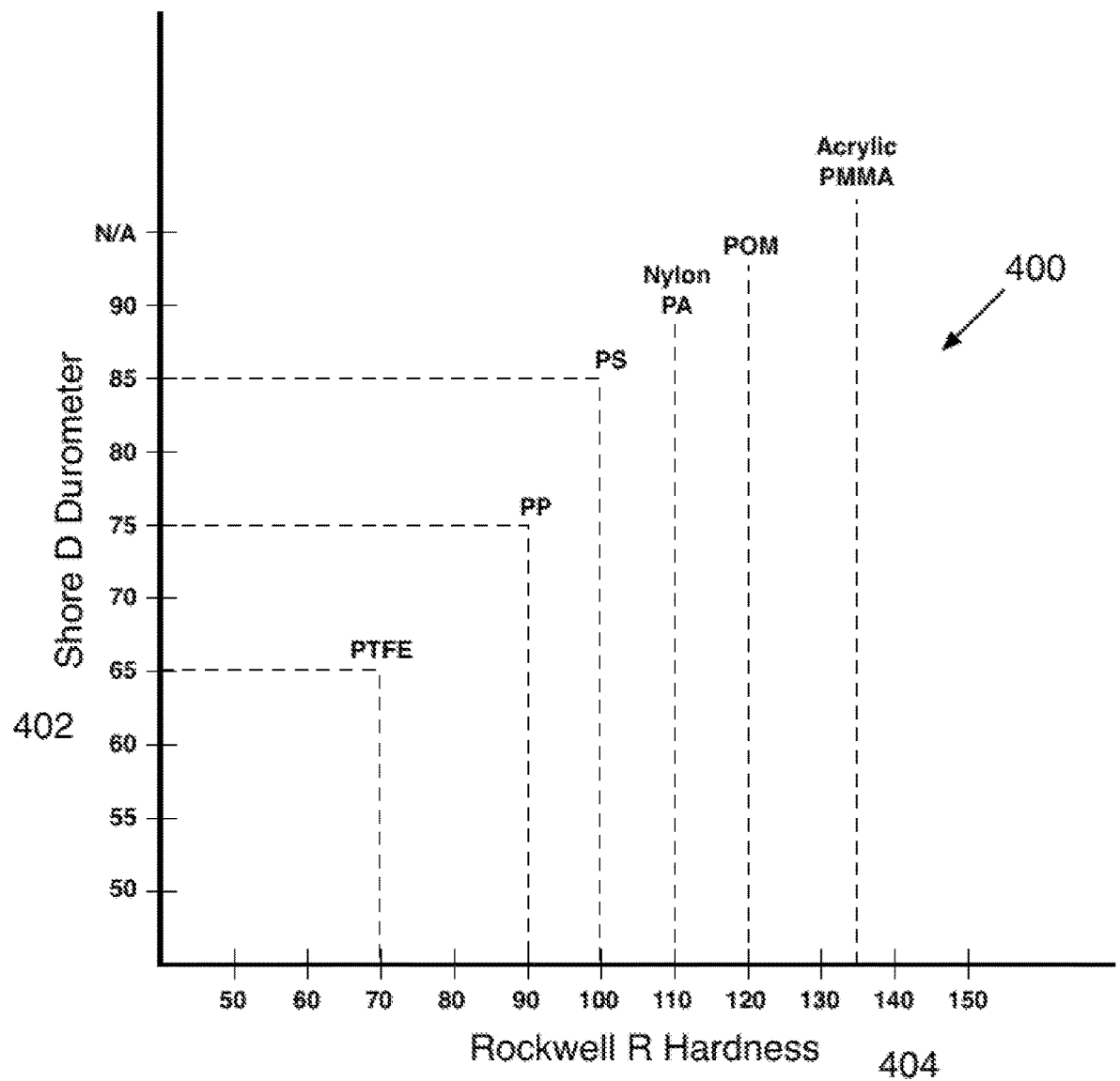
FIG. 4 illustrates an example range of hardness values for example thermoplastic materials in accordance with various embodiments of the present disclosure.

As illustrated in FIG. 4, an example of hardness ranges 400 is provided in both Shore D Durometer 402 and Rockwell R Hardness 404 scales for sample thermoplastic resins. Specifically, values for Polytetrafluoroethylene (PTFE), Polypropylene (PP), Polystyrene (PS), Nylon, Acetal (POM) and Acrylic are provided. These values represent approximate hardness values for a part that is ready to be ejected.

Figure 5:
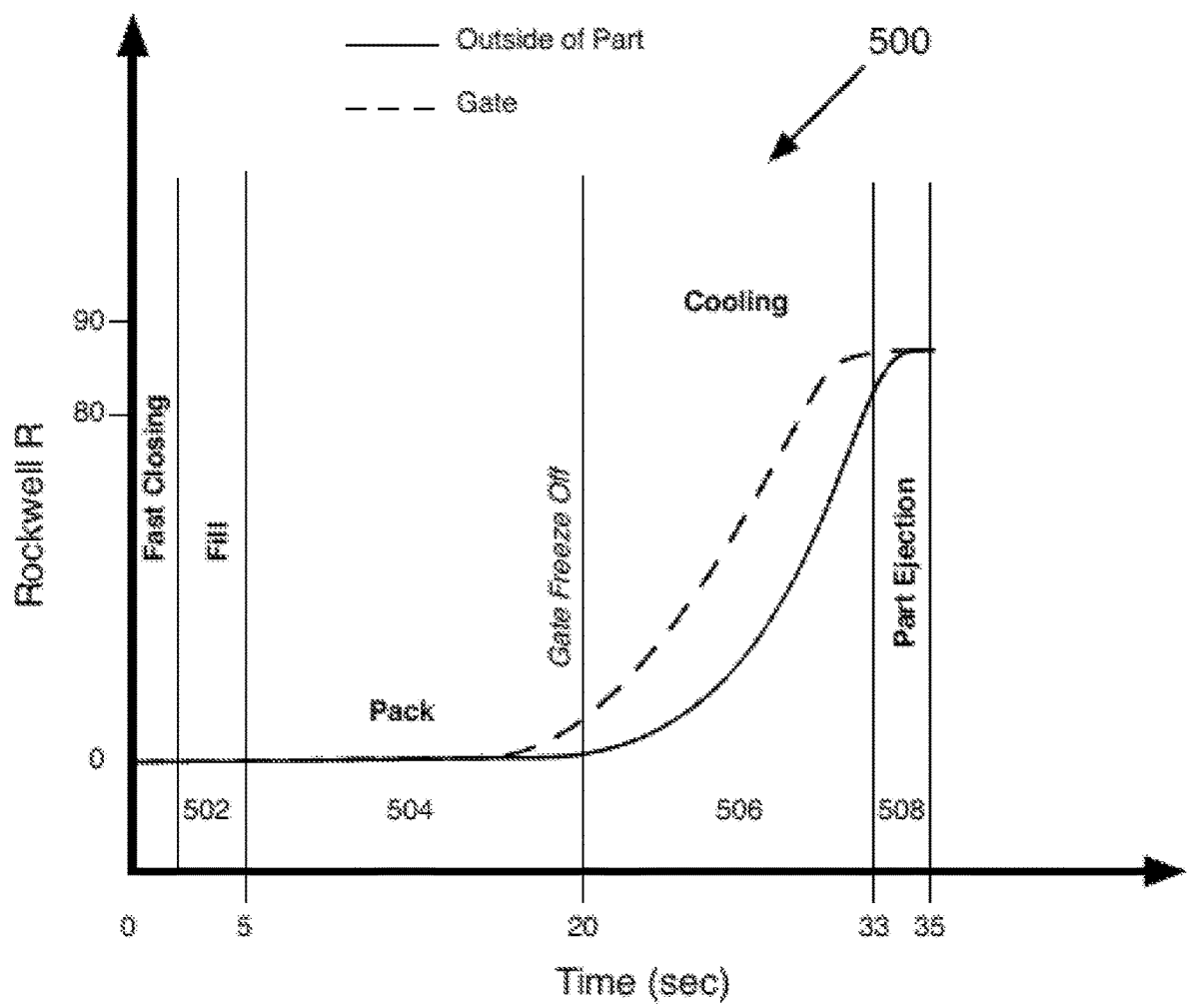
FIG. 5 illustrates an example hardness profile for an injection molding cycle in accordance with various embodiments of the present disclosure.

Turning to FIG. 5, an example hardness profile 500 of an injection molding cycle includes a number of distinct stages. In this example, the sensors 128, 129 are any type of in-mold sensor capable of determining the apparent hardness value in combination with an algorithm (e.g., a linear transducer/encoder having a high k-factor with the ability to move with applied strain and/or load) and are disposed at the gate 120 and/or at another location inside or near the inside of the mold 118 or mold cavity 122.

During a first stage 502, the molten plastic material 114 fills the mold cavity 122. In this stage 502, both the gate and mold hardness are relatively constant and close to zero. During stage 504, after the mold cavity 122 is filled, the molten plastic material 114 begins to pack into the mold cavity 122. Here, the gate 120 experiences a slight increase in hardness followed by a slight increase in hardness on the outside of the molded part. During the third stage 506, gate 120 freeze off occurs, and the mold begins the cooling phase. The gate 120 area hardness rapidly increases, which is followed by a slight increase in hardness on the outside of the molded part. In the cooling stage 506, the part becomes hardened and solidified as sufficient heat is removed, thus, gate 120 area hardness rapidly begins to plateau, followed by a rapid increase and plateau in hardness on the outside of the molded part. At the fourth stage 508, the part is sufficiently structurally sound to be ejected from the cavity 122.

In these examples, the defining threshold value can be a gate freeze off hardness value or hardness value of the part. Accordingly, upon the sensor 128 measuring a hardness value above a specified gate freeze off value, the controller 140 may transmit a signal to cause the part to be ejected. In some examples, the defining threshold value can be a rate of change or decay in the gate 120 or the cavity 122 hardness value. The controller 140 may calculate the rate of change in hardness by any number of approaches such as by comparing a change or slope of apparent hardness values over a given time interval.

Figure 6:
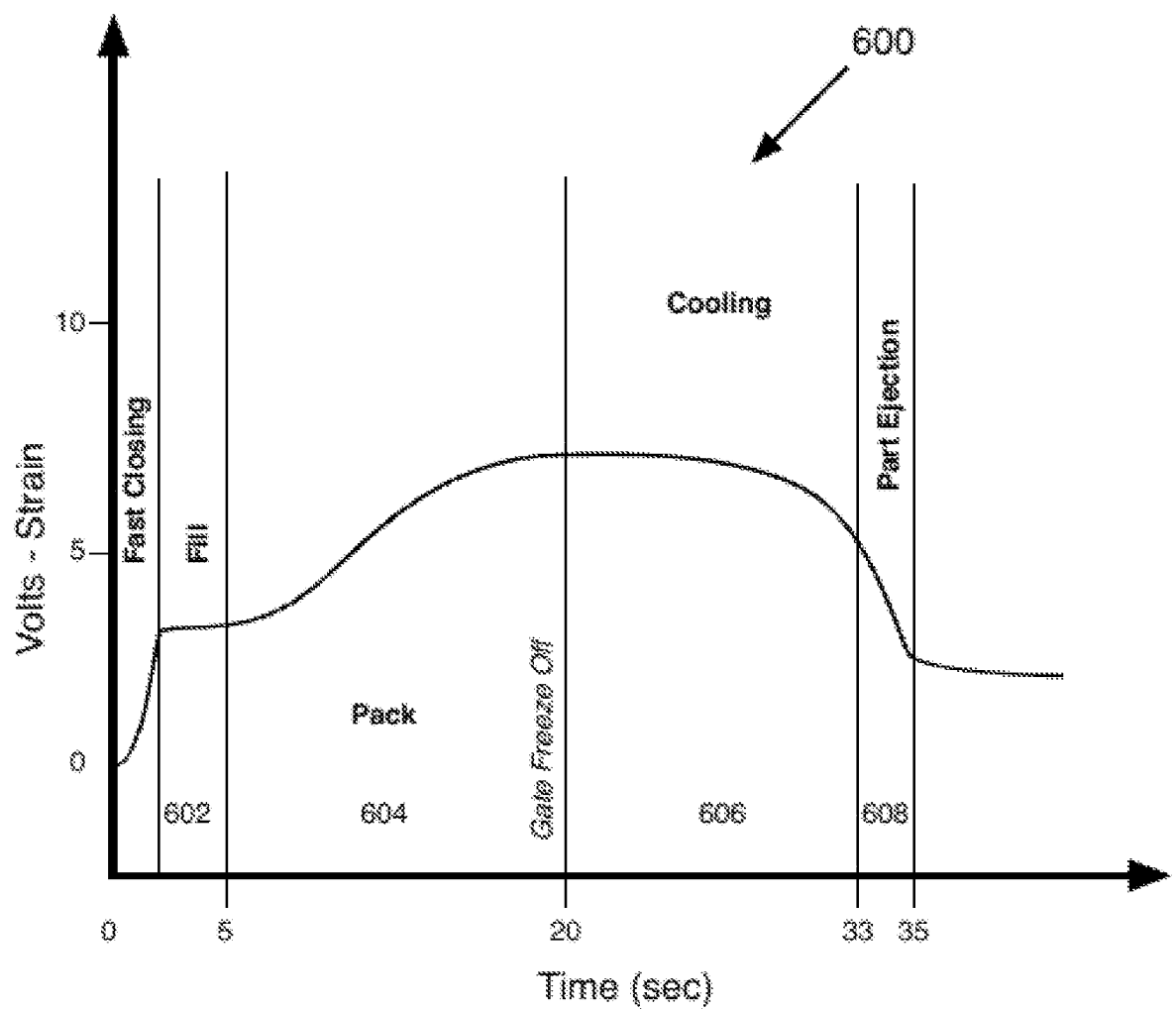
FIG. 6 illustrates an example strain profile for an injection molding cycle in accordance with various embodiments of the present disclosure.

As illustrated in FIG. 6, an example of a strain profile 600 of an injection molding cycle includes a number of distinct stages. For example, U.S. patent application Ser. No. 15/216,762, filed on Jul. 22, 2016, the contents of which are hereby incorporated by reference in its entirety, includes a description of these stages. In this example, the sensors 128, 129 are any type of in mold sensors capable of determining a strain value and are disposed at or near the parting line of the mold, or at or near the outside of the cavity or core blocks. At a first stage 602, the molten plastic material 114 fills the mold cavity 122. In this stage 602, the increase in strain is relatively constant and close to zero. At stage 604, after the mold cavity 122 is filled, the molten plastic material 114 begins to pack into the mold cavity 122. Here, the mold cavity 122 experiences an increase in strain as the force of the molten plastic material 114 pushes on the steel inside the mold cavity 122. At the third stage 606, gate 120 freeze off occurs, and the mold begins the cooling phase. The strain value starts to decrease as the plastic is no longer being forced up against the steel inside the mold cavity 122. In the cooling stage 606, the part becomes hardened and solidified as sufficient heat is removed, thus, the part starts to shrink away from the steel inside the cavity 122, followed by a rapid decrease in strain on the outside of the mold or cavity/core insert. At the fourth stage 608, the part is sufficiently structurally sound to be ejected from the cavity 122.

In these examples, the defining threshold value may be an actual strain value measured in voltage. Accordingly, upon the sensor 128 measuring a strain value above or below a specified strain voltage value, the controller 140 may transmit a signal to cause the part to be ejected. In some examples, the defining threshold value can be a rate of change or decay in the strain voltage value. The controller 140 may calculate the rate of change in strain by any number of approaches such as comparing a change or slope of strain values over a given time interval.

Figure 7:
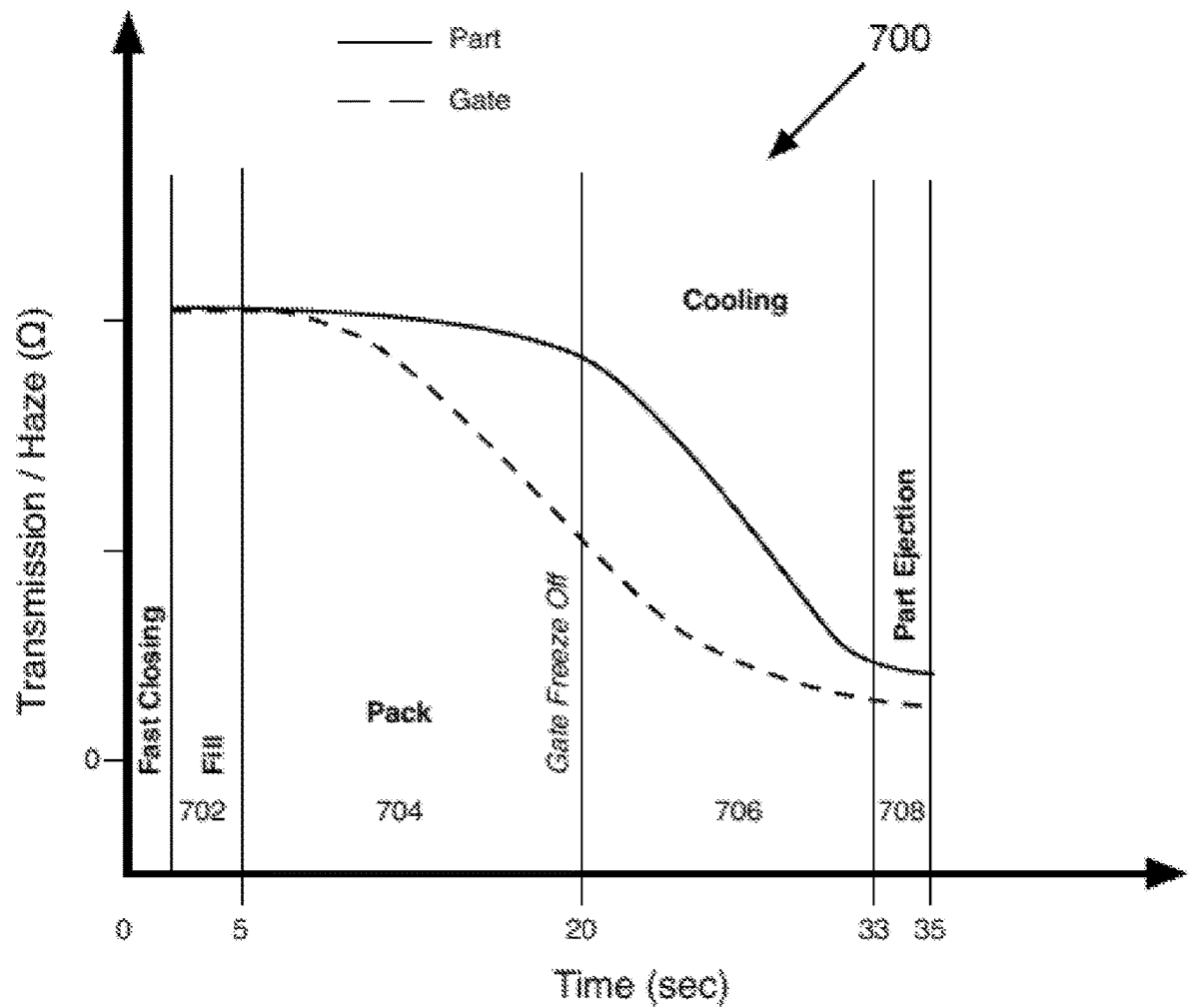
FIG. 7 illustrates an example light transmission profile for an injection molding cycle in accordance with various embodiments of the present disclosure.

As illustrated in FIG. 7, an example of a light transmission profile 700 of an injection molding cycle includes a number of distinct stages. In this example, the sensors 128, 129 are any type of in mold sensors capable of determining the absence or presence of light and are disposed at or near the cavity gate 120 of the mold, or in the mold cavity 122. At a first stage 702, the molten plastic material 114 fills the mold cavity 122. In this stage 702, the change in resistance is relatively unchanged and close to the maximum resistance value for the particular sensor being used. The maximum resistance value corresponds light transmission being unobstructed. At stage 704, after the mold cavity 122 is filled, the molten plastic material 114 begins to pack into the mold cavity 122. Here, the mold cavity 122 experiences a decrease in resistance signifying a blocking of the transmission of light. At the third stage 706, gate 120 freeze off occurs, and the mold begins the cooling phase. The resistance value starts to decrease dramatically. In the cooling stage 706, the part becomes hardened and solidified as sufficient heat is removed, thus, the part starts to harden and/or crystallize inside the cavity 122, thereby causing a rapid decrease in measured resistance. At the fourth stage 708, the part is sufficiently structurally sound to be ejected from the cavity 122.

In these examples, the defining threshold value may be an actual or calculated resistance value measured in ohms. Accordingly, upon the sensor 128 measuring a value above or below a specified resistance ohm value, the controller 140 may transmit a signal to cause the part to be ejected. In some examples, the defining threshold value can be a rate of change or decay in the resistance ohm value. The controller 140 may calculate the rate of change in resistance by any number of approaches such as comparing a change or slope of resistance values over a given time interval.

Figure 8:
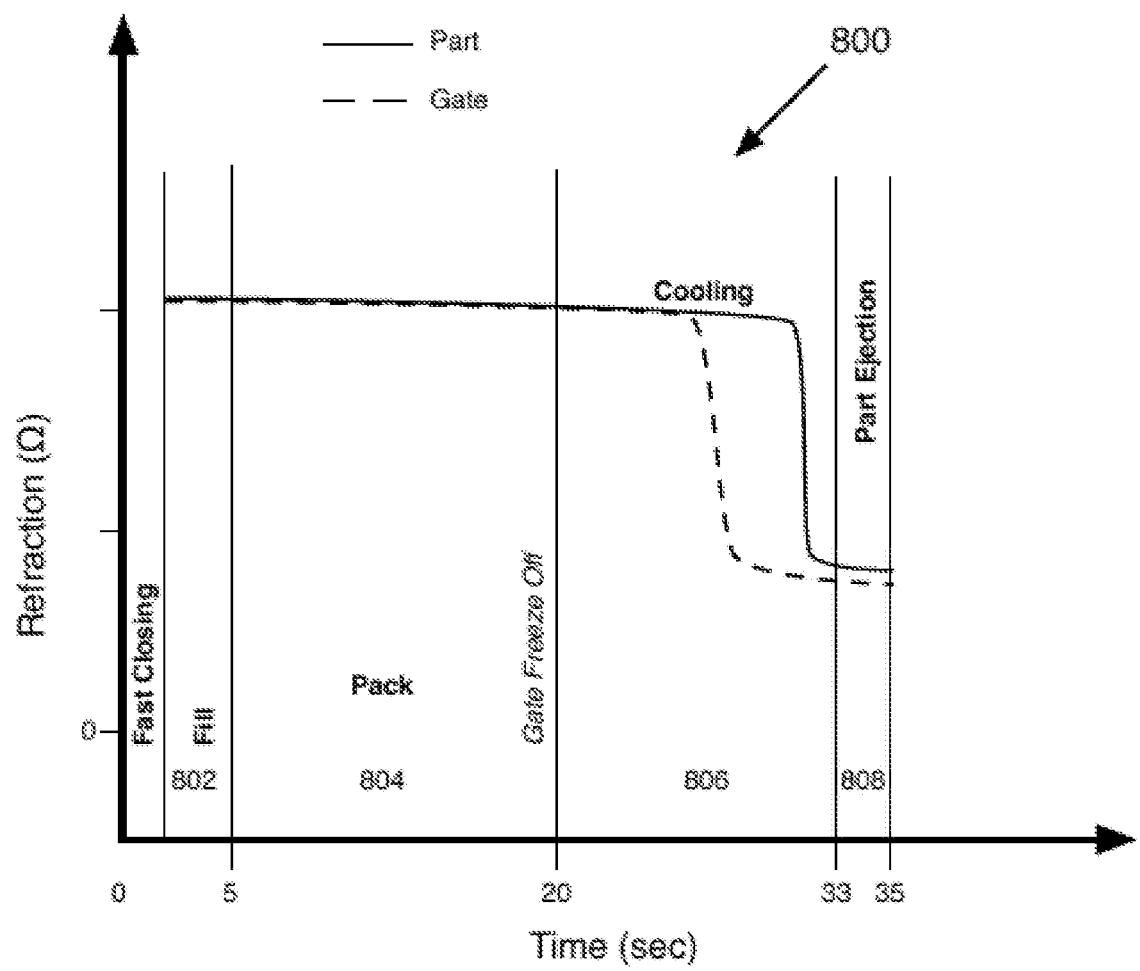
FIG. 8 illustrates and example light refraction profile for an injection molding cycle in accordance with various embodiments of the present disclosure.

As illustrated in FIG. 8, an example of a refraction profile 800 of an injection molding cycle includes a number of distinct stages. In this example, the sensors 128, 129 are any type of in mold sensors capable of determining the absence or presence of light (measured in resistance) and are disposed at or near the cavity gate 120 of the mold, or in the mold cavity 122. At a first stage 802, the molten plastic material 114 fills the mold cavity 122. In this stage 802, the change in resistance is unchanged and close to the maximum resistance value for the particular sensor being used. At stage 804, after the mold cavity 122 is filled, the molten plastic material 114 begins to pack into the mold cavity 122. Here, the mold cavity 122 experiences no change in resistance due to contact between the molten plastic material 114 and the steel surface of the mold cavity 122. At the third stage 806, gate 120 freeze off occurs, and the mold begins the cooling phase. The resistance value starts to decrease dramatically for the gate area initially due to the separation between the shrinking plastic material and the mold cavity 122. In the cooling stage 806, the part becomes hardened and solidified as sufficient heat is removed, thus, the part starts to harden and/or crystallize inside the cavity 122, followed by a rapid decrease in resistance due to the part shrinking away from the mold cavity 122. At the fourth stage 808, the part is sufficiently structurally sound to be ejected from the cavity 122.

In these examples, the defining threshold value may be an actual or calculated resistance value measured in ohms. Accordingly, upon the sensor 128 measuring a value above or below a specified resistance ohm value, the controller 140 may transmit a signal to cause the part to be ejected. In some examples, the defining threshold value can be a rate of change or decay in the resistance ohm value. The controller 140 may calculate the rate of change in resistance by any number of approaches such as comparing a change or slope of resistance values over a given time interval.

In some examples, any of the sensors 128, 129 may be adapted to measure any number of optical characteristics of the part to determine whether a threshold value is exceeded. For example, the sensor or sensors 128, 129 may be an optical light sensor, an infrared sensor, a fiber optic sensor, a color or image sensor, a photo detector, and the like. The sensor or sensors 128, 129 can be disposed in or near the cavity 122 to measure the desired optical characteristic of the part. For example, the sensor or sensors 128, 129 can be adapted to measure a light transmission, reflection, refraction, and/or absorption value to determine the translucency and/or color of the part. In these examples, the molded part may have a particular optical value that varies as the part cools, thus upon reaching a threshold value that corresponds to a structurally sound part that will not deform or be damaged upon ejection from the cavity 120, the sensor or sensors 128, 129 may measure this value and the controller 140 may determine the part is ready to be ejected. In some examples, the plastic material 114 may include a pigment or other chemical that changes colors as a function of material temperature. The sensor or sensors 128, 129 can sense these varying colors and eject the part when the part reaches a particular color. The mechanism or device used to detect these changes can include a system for detecting a change in voltage and/or resistance and is specific to each individual application with regards to material type and part geometry.

In some examples, any of the sensors 128, 129 may be adapted to measure a difference in color or opaqueness of the part. For example, a specified Delta-E value indicating a level of crystallinity and/or opacity of a given part or material may be used to determine part readiness. Many semi-crystalline polymers appear clear in the melt state of the injection molding process, and they turn opaque during cooling. A semi-crystalline polymer becomes opaque due to crystalline formations in the polymer matrix refracting and scattering light. The color or opacity of the polymer can be referenced to assist in determining when to trigger the part to be removed from the mold cavity 122. In some examples, a particular polymer opacity can be designated as a threshold value of crystallinity. The amount of crystallinity in a polymer will change the physical and mechanical properties of the polymer, so sensing the amount of crystallinity prior to ejection can provide a clear indication as to whether the part is sufficiently structurally sound to be ejected.

In some examples, any of the sensors 128, 129 may be adapted to measure the specific gravity, that is, the ratio of the mass of the part to the mass of a reference part for the same given volume, of the part to determine whether a threshold value is exceeded. For example, the sensor or sensors 128, 129 may be used to calculate an apparent specific gravity based on position using a reflective sensor or a linear transducer or encoder having a movable pin and high-k factor positioned in the runner system, at or near the gate 120, or in the mold cavity 122. In some examples, a pre-determined part mass may be used and periodically be compared to a measured value of the molded part until a particular specific gravity value that corresponds to a structurally sound part that will not deform or be damaged upon ejection from the cavity 120 is calculated by the controller 140, which can determine the part is ready to be ejected.

In some examples, any of the sensors 128, 129 may be adapted to measure molecular motion of the part to determine whether a threshold value is exceeded. For example, the sensor or sensors 128, 129 may be any type of spectroscopy device capable of capturing various forms of molecular movement. The sensor or sensors 128, 129 can be disposed in or near the cavity 122 to measure the desired level of molecular stability of the part. In these examples, the molded part may have a particular molecular movement value that decreases as the part cools, thus upon reaching a threshold value that corresponds to a structurally sound part that will not deform or be damaged upon ejection from the cavity 120, the sensor or sensors 128, 129 may measure this value and the controller 140 may determine the part is ready to be ejected. For example, a heat or temperature sensor may be used in these applications.

In some examples, any of the sensors 128, 129 may be adapted to measure an amount the part has shrunk in the mold cavity. For example, a particular material may have a known shrink rate and internal mold temperature. When the part is determined to have shrunk a sufficient threshold value that corresponds to a structurally sound part that will not deform or be damaged upon ejection from the cavity 120, the sensor or sensors 128, 129 may measure this value and the controller 140 may determine the part is ready to be ejected. For example, air may be pumped through the mold cavity 122 at a known pressure, and the rate, speed, or velocity in which the air reaches any of the sensors 128, 129, or a drop in pressure of the introduced air, may be indicative of a gap size between an outer wall of the molded part and the mold cavity 122. When any of the sensors 128, 129 measures a threshold value, the part is sufficiently structurally sound and is ready to be ejected, so the sensors 128, 129 may be networked with the controller 140 to initiate ejection of the part upon realization of that condition.

In some examples, any of the sensors 128, 129 may be adapted to measure sound characteristics of the part in the mold cavity. For example, a particular material may have known density values. When the part is determined to have a sufficient threshold density value that corresponds to a structurally sound part that will not deform or be damaged upon ejection from the cavity 120, the sensor or sensors 128, 129 may measure this value and the controller 140 may determine the part is ready to be ejected. For example, any of the sensors 128, 129 may be adapted to transmit and/or measure ultrasonic sound waves that can pass through the molded part. The threshold is met when a specific frequency is measured that correlates to a structurally sound density.

Any of the described measured values may be measured at various locations (i.e., inside or outside of the mold cavity 122). In examples where the measured values are taken at a location outside of the mold cavity 122, after the mold is opened, but subsequent to the part being ejected, the sensor or sensors 128, 129 can be adapted to measure the desired variable and determine whether the part is sufficiently structurally sound to be ejected from the mold cavity 122. If a part is determined to have inadequate cooling after the part is ejected, the controller 140 will send an output to the molding machine 100 to indicate that the part is a "reject." The part would then be handled in accordance with existing procedures in the facility for disposing of rejected parts.

In some examples, a process may measure a non-time dependent variable value determined to be representative of a part being structurally sound during a first injection molding cycle. During a subsequent injection molding cycle, the process may again measure the non-time dependent variable value and compare the subsequent measurement to the first measurement. Upon the second measurement being approximately equal to the first measurement, the process may eject the part from the mold cavity 122. So configured, the process can be configured to operate on an inter-cycle basis. It is understood that in some examples, the process may rely on a predetermined non-time dependent variable threshold value and thus comparisons between measured values and the threshold value may be made in a first molding cycle.

In some examples, an indication of gate freeze or any other indication of part readiness can be used to trigger a cube mold to rotate to the next station. If the injection of the base component is the rate limiting step in the cube mold process, the overall cycle time will be reduced by the corresponding amount. Further, an indication of part readiness may be implemented in secondary cooling steps in a cube mold process where any of the previously mentioned threshold values are obtained (e.g., a hardness value).

Further, in some examples, any number of different types of sensors may be used in a combination to represent an "average" part readiness condition of all parts on the face of a mold. When this average value exceeds a desired threshold, all of the parts may be ejected.

In some examples, the machine may monitor results of one or more cycles or shots to determine optimal ejection times for subsequent mold cycles or shots. Accordingly, an overall part measurement may be used to represent the level of part readiness. This value can be used to adjust the subsequent shot based on these results.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A method for determining whether a part is ready to be ejected from a mold cavity during an injection molding cycle, the method comprising:
   measuring at least one non-time dependent variable during the injection molding cycle;
   upon the measured at least one non-time dependent variable reaching a threshold value indicative of the part being structurally sound, ejecting the part from the mold cavity;
   wherein the at least one non-time dependent variable comprises at least one of a Shore D Durometer or a Rockwell R hardness value measured via a hardness sensor.

2. The method of claim 1, wherein the at least one non-time dependent variable is measured at a location inside of the mold cavity.

3. The method of claim 1, wherein the at least one non-time dependent variable is measured at a location outside of the mold cavity.

4. The method of claim 1, further comprising, in a subsequent injection molding cycle, using the measured variable from the previous injection molding cycle to determine when the part is structurally sound for ejection from the mold cavity.

5. A method for determining whether an injection molded part is ready to be ejected from an injection mold cavity, the method comprising:
   measuring one or more non-time dependent variables at a location outside of the mold cavity, wherein the at least one non-time dependent variable comprises at least one of a Shore D Durometer or a Rockwell R hardness value measured via a hardness sensor;
   upon the measured one or more non-time dependent variables reaching a threshold value indicative of the part being structurally sound, ejecting the part from the mold cavity.

6. The method of claim 5, further comprising, in a subsequent injection molding cycle, using the measured variable from the previous injection molding cycle to determine when the part is structurally sound for ejection from the mold cavity.

7. A method for determining whether an injection molded part is ready to be ejected from an injection mold cavity, the method comprising: in a first injection molding cycle, injecting a first shot of molten plastic material into a mold cavity; during the first injection molding cycle, measuring a first non-time dependent variable value of a non-time dependent variable, the first non-time dependent variable value being indicative of a part being structurally sound; during a second injection molding cycle subsequent to the first injection molding cycle, injecting a second shot of molten plastic material into the mold cavity; during the second injection molding cycle, measuring a second non-time dependent variable value of the non-time dependent variable; and ejecting the part from the mold cavity when the second non-time dependent variable value is approximately equal to the first non-time dependent variable value; wherein the non-time dependent variable comprises at least one of a shore D Durometer or a Rockwell R hardness value measured via a hardness sensor.

8. The method of claim 7, wherein the first non-time dependent variable value is measured prior to ejecting the part from the mold cavity.

9. The method of claim 7, wherein the first non-time dependent variable value is measured after the part produced during the first injection molding cycle is ejected from the mold cavity.

* * * * *

UNITED STATES PATENT AND TRADEMARK OFFICE
CERTIFICATE OF CORRECTION

PATENT NO. : 11,072,102 B2
APPLICATION NO. : 15/943786
DATED : July 27, 2021
INVENTOR(S) : Nicholas Mulkern Unkovic et al.

Page 1 of 1

It is certified that error appears in the above-identified patent and that said Letters Patent is hereby corrected as shown below:

In the Claims

At Column 14, Line 37, "shore" should be -- Shore --.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*